United States Patent
Sun et al.

(10) Patent No.: US 11,449,094 B2
(45) Date of Patent: Sep. 20, 2022

(54) DISPLAY DEVICE ASSEMBLY HAVING MIRROR SURFACE

(71) Applicant: BOE TECHNOLOGY GROUP CO., LTD., Beijing (CN)

(72) Inventors: Junmin Sun, Beijing (CN); Yunpeng Wu, Beijing (CN); Lei Cao, Beijing (CN); Yan Ren, Beijing (CN); Zifeng Wang, Beijing (CN); Jinggang Wei, Beijing (CN); Dianmeng Li, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 226 days.

(21) Appl. No.: 16/983,763

(22) Filed: Aug. 3, 2020

(65) Prior Publication Data

US 2021/0089093 A1   Mar. 25, 2021

(30) Foreign Application Priority Data

Sep. 24, 2019   (CN) .......................... 201921592730.X

(51) Int. Cl.
*G06F 1/16*   (2006.01)
*G06F 1/18*   (2006.01)
(Continued)

(52) U.S. Cl.
CPC ............. *G06F 1/1605* (2013.01); *A47G 1/02* (2013.01); *A47G 1/16* (2013.01); *F16M 11/04* (2013.01);
(Continued)

(58) Field of Classification Search
CPC ............. Y10S 248/917; Y10S 248/918; Y10S 248/919; Y10S 248/92; Y10S 248/921;
(Continued)

(56) References Cited

U.S. PATENT DOCUMENTS 10,076,176 B2 *   9/2018   Yang ..................... F21V 33/004
11,262,790 B1 *   3/2022   Buxton ..................... A47G 1/16
(Continued)

FOREIGN PATENT DOCUMENTS

CN   201867823 U   *   6/2011
CN   107224161 A   *   10/2017   ............... A47G 1/02
(Continued)

*Primary Examiner* — Nidhi Thaker
(74) *Attorney, Agent, or Firm* — Brooks Kushman P.C.

(57) ABSTRACT

A display device assembly having a mirror surface is provided. The display device includes: a display device having the mirror surface, the display device includes a mirror component and a back plate spaced apart from each other, and the back plate is provided with an avoiding hole; an inner wall hanging component, the inner wall hanging component is located between the mirror component and the back plate and is connected to at least one of the mirror component and the back plate; and an outer wall hanging component, the outer wall hanging component is located on a side of the back plate away from the mirror component, and a portion of the outer wall hanging component passes through the avoiding hole and is engaged detachably with the inner wall hanging component.

15 Claims, 9 Drawing Sheets

(51) Int. Cl.
*A47G 1/02* (2006.01)
*F16M 11/04* (2006.01)
*A47G 1/16* (2006.01)

(52) U.S. Cl.
CPC ............ *G06F 1/1609* (2013.01); *G06F 1/182* (2013.01); *Y10S 248/917* (2013.01); *Y10S 248/918* (2013.01)

(58) Field of Classification Search
CPC ............ Y10S 248/922; Y10S 248/923; Y10S 248/924; A47G 1/02; A47G 1/16; G02B 5/0816; G06F 1/1605; F16M 11/04
See application file for complete search history.

(56) References Cited

U.S. PATENT DOCUMENTS

| | | | | |
|---|---|---|---|---|
| 2020/0348896 A1* | 11/2020 | Liu | ................ | H05K 5/0217 |
| 2021/0068543 A1* | 3/2021 | Yoon | ................ | H01F 7/02 |

FOREIGN PATENT DOCUMENTS

| | | | | | |
|---|---|---|---|---|---|
| CN | 107713550 A | * | 2/2018 | ............... | A47G 1/02 |
| CN | 209569509 U | * | 11/2019 | | |
| CN | 211408422 U | * | 9/2020 | | |
| CN | 212719055 U | * | 3/2021 | | |
| CN | 213750810 U | * | 7/2021 | | |
| CN | 113432019 A | * | 9/2021 | | |
| JP | H1085103 A | * | 4/1998 | | |

* cited by examiner

DISPLAY DEVICE ASSEMBLY HAVING MIRROR SURFACE

CROSS-REFERENCE TO RELATED APPLICATION

This application claims priority to Chinese Patent Application No. 201921592730.X filed on Sep. 24, 2019, which is incorporated herein by reference in its entirety.

TECHNICAL FIELD

The present disclosure relates to the field of a display device, in particular to a display device assembly having a mirror surface.

BACKGROUND

A display device may be a smart magic mirror. By embedding a display screen, a sensor and an operating system in a mirror in the related art, a mirror display function and a human-mirror interaction function are added into the mirror. A user may wake up a magic mirror system and control a smart home device through touch, human body sensing or voice recognition.

SUMMARY

A display device assembly having a mirror surface according to some embodiments of the present disclosure including: a display device having the mirror surface, the display device includes a mirror component and a back plate spaced apart from each other, and the back plate is provided with an avoiding hole; an inner wall hanging component, the inner wall hanging component is located between the mirror component and the back plate and is connected to at least one of the mirror component and the back plate; and an outer wall hanging component, the outer wall hanging component is located on a side of the back plate away from the mirror component, and a portion of the outer wall hanging component passes through the avoiding hole and is engaged detachably with the inner wall hanging component.

In some embodiments of the present disclosure, a thickness of the back plate ranges from 0.2 mm to 0.6 mm.

In some embodiments of the present disclosure, the inner wall hanging component is connected to the mirror component, a surface of the mirror component facing the inner wall hanging component is provided with a fixing plate, and the inner wall hanging component and the fixing plate are connected by using a fastener.

In some embodiments of the present disclosure, the fixing plate is adhesively connected to the mirror component.

In some embodiments of the present disclosure, the inner wall hanging component is not connected to the back plate.

In some embodiments of the present disclosure, the inner wall hanging component includes: a first segment and a second segment located in a first direction of the avoiding hole, wherein one end of the first segment is connected to the mirror component, the other end of the first segment extends along a direction close to the back plate, one end of the second segment is connected to the other end of the first segment and the other end of the second segment extends along a second direction; the first direction is parallel to a direction from the avoiding hole to the first segment when the inner wall hanging component and the outer wall hanging component are engaged, the second direction is opposite to the first direction; the outer wall hanging component comprises a body plate, a first connection segment and a second connection segment, wherein the body plate is located on a side of the back plate away from the mirror component, and one end of the first connection segment is connected to a side surface of the body plate facing the back plate, the other end of the first connection segment extends along a direction close to the mirror component and passes through the avoiding hole, one end of the second connection segment is provided on a portion of the first connection segment between the mirror component and the back plate, and the other end of the second connection segment extends along the first direction; and the other end of the second connection segment abuts a surface of the first segment facing the second direction; and/or a surface of the second segment facing the second direction abuts the portion of the first connection segment between the mirror component and the back plate.

In some embodiments of the present disclosure, the second segment abuts between the second connection segment and the back plate.

In some embodiments of the present disclosure, the inner wall hanging component includes: an annular connection plate, the connection plate is connected to the mirror component; a cylindrical connection cylinder, one axial end of the connection cylinder is connected to an inner peripheral wall of the connection plate, the other axial end of the connection cylinder extends along a direction close to the back plate, and the connection cylinder surrounds the avoiding hole, a portion of the connection cylinder located in the first direction of the avoiding hole defines the first segment; and an annular flange plate, an outer peripheral wall of the flange plate is connected to an inner peripheral wall of the other axial end of the connection cylinder, the flange plate surrounds the avoiding hole, and a portion of the flange plate located in the first direction of the avoiding hole defines the second segment.

In some embodiments of the present disclosure, a waterproof component is provided between the flange plate and the back plate, and the waterproof component is of an annular shape and surrounds the avoiding hole.

In some embodiments of the present disclosure, the waterproof component is made of silicone, rubber or sponge.

In some embodiments of the present disclosure, the outer wall hanging component includes a wall hanging screw, the wall hanging screw includes a screw head and a stud, an axial end of the stud is welded to the body plate, the other axial end of the stud is connected to the screw head, the stud defines the first connection segment, and a portion of the screw head in the first direction of the avoiding hole defines the second connection segment.

In some embodiments of the present disclosure, a length of the first connection segment ranges from 4 mm to 8 mm.

In some embodiments of the present disclosure, the avoiding hole includes a mounting hole and a positioning hole, the mounting hole is located in the second direction of the positioning hole, the positioning hole communicates with the mounting hole, and a cross-sectional area of the positioning hole is smaller than that of the mounting hole, a portion of the first connection segment located in the avoiding hole abuts the inner wall hanging component in the positioning hole.

In some embodiments of the present disclosure, a portion of the back plate is recessed toward the mirror component to form a recessed portion, and the avoiding hole is provided on the recessed portion, the recessed portion defines an accommodation space for accommodating the outer wall hanging component.

In some embodiments of the present disclosure, a side surface of the outer wall hanging component away from the mirror component is flush with an end surface of an open end of the recessed portion.

In some embodiments of the present disclosure, the outer wall hanging component is provided with a weight reduction hole and a plurality of fixing holes, the weight reduction hole is located in the middle of the outer wall hanging component and penetrates the outer wall hanging component in a thickness direction of the outer wall hanging component, and the plurality of fixing holes are spaced apart in a peripheral direction of the weight reduction hole.

In some embodiments of the present disclosure, the weight reduction hole is of a shape composed of two long U-shapes, and the plurality of fixing holes include two main fixing holes and a plurality of auxiliary fixing holes, and the two main fixing holes are respectively located at the bottoms of the two long U-shapes.

Additional aspects and advantages of the present disclosure will be partially given in the following description, and some will become apparent from the following description, or be learned through an operation of the present disclosure.

BRIEF DESCRIPTION OF THE DRAWINGS

The above and/or additional aspects and advantages of the present disclosure will become apparent and easy to be understood from the description of the embodiments with reference to the following drawings, in which.

DETAILED DESCRIPTION

Figure 1:
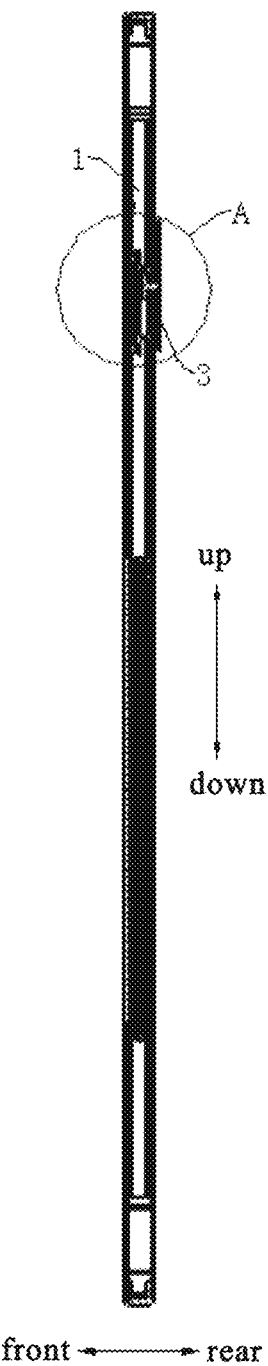
FIG. 1 is a schematic structural view of a display device assembly having a mirror surface according to some embodiments of the present disclosure.

The embodiments of the present disclosure will be described in detail below, and examples of the embodiments are shown in the drawings, in which same or similar reference numerals throughout indicate same or similar elements or elements having same or similar functions. The embodiments described below with reference to the drawings are exemplary, only used to explain the present disclosure, and cannot be construed as a limitation to the present disclosure.

A display device assembly 100 having a mirror surface according to the embodiments of the present disclosure will be described below with reference to the drawings.

Figure 2:
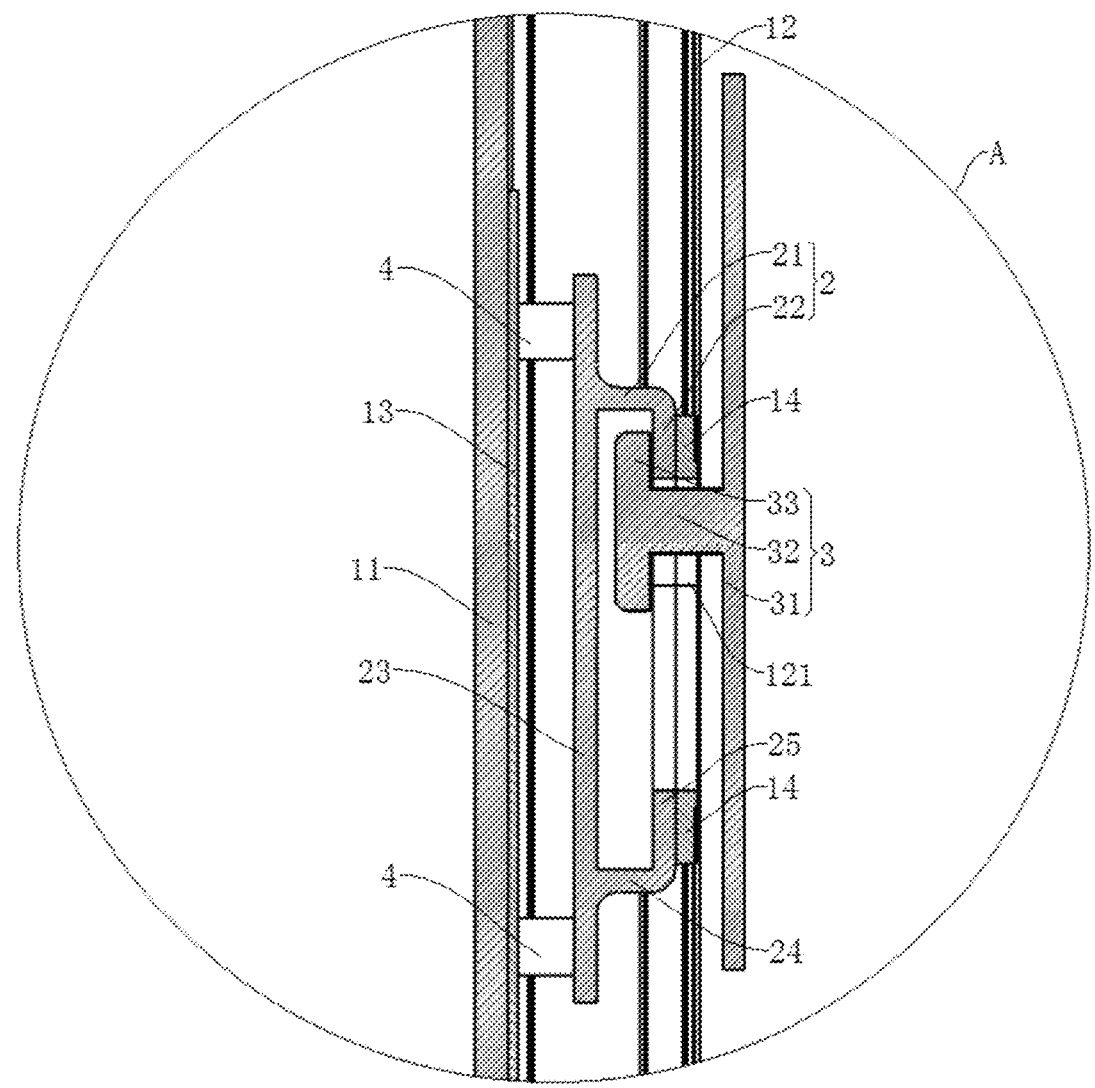
FIG. 2 is an enlarged view of A in FIG. 1.
Figure 4:
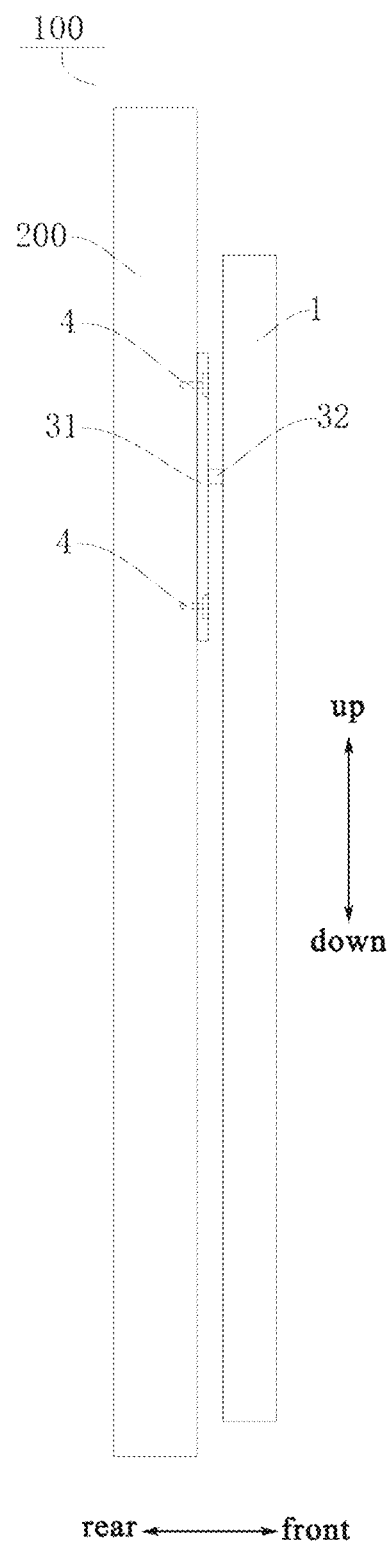
FIG. 4 is a schematic view of a display device assembly having a mirror surface mounted to a wall according to some embodiments of the present disclosure.

Referring to FIG. 1 and FIG. 2, the display device assembly 100 having the mirror surface according to the embodiments of the present disclosure may include a display device 1 having the mirror surface, an inner wall hanging component 2 and an outer wall hanging component 3. The inner wall hanging component 2 is located in the display device 1 and the outer wall hanging component 3 is suitable for being connected to a wall 200 (as shown in FIG. 4), a wardrobe, etc.

Figure 3:
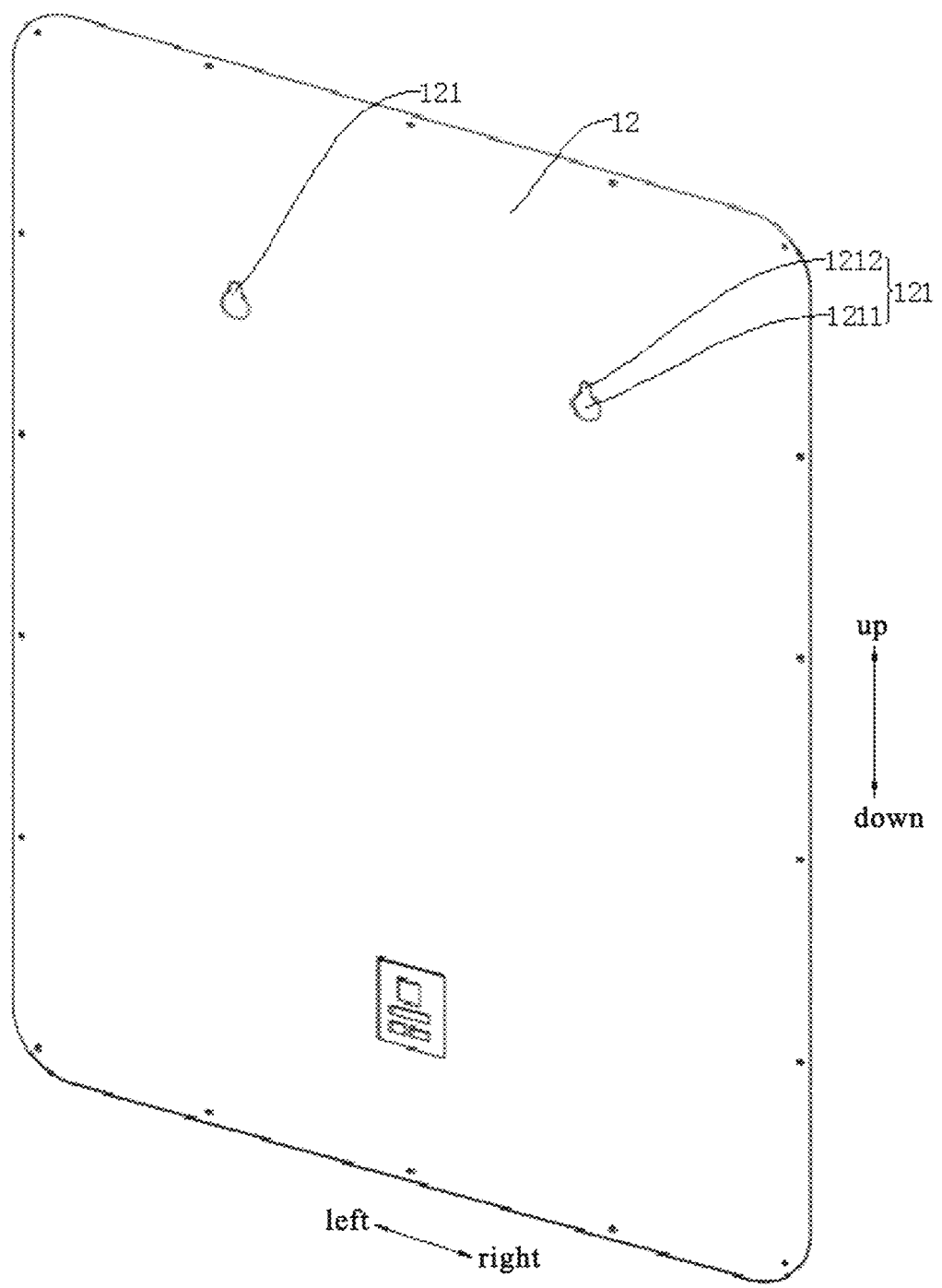
FIG. 3 is a schematic structural view of a back plate according to some embodiments of the present disclosure.

Specifically, referring to FIG. 2 and FIG. 3, the display device 1 includes a mirror component 11 and a back plate 12 spaced apart from each other, and the back plate 12 is provided with an avoiding hole 121. The inner wall hanging component 2 is located between the mirror component 11 and the back plate 12 and is connected to at least one of the mirror component 11 and the back plate 12. In other words, the inner wall hanging component 2 is connected to the mirror component 11 (as shown in FIG. 2), or the inner wall hanging component 2 is connected to the back plate 12, or the inner wall hanging component 2 is connected to both the mirror component 11 and the back plate 12.

Referring to FIG. 2, the outer wall hanging component 3 is located on a side of the back plate 12 away from the mirror component 11, and a portion of the outer wall hanging component 3 passes through the avoiding hole 121 and is engaged detachably with the inner wall hanging component 2. For example, a portion of the outer wall hanging component 3 may pass through the avoiding hole 121 and be engaged with the inner wall hanging component 2 by using a buckle connection and a threaded connection.

It is found through practical study that, a display device assembly having a mirror surface in the related art includes a display device having the mirror surface and an outer wall hanging component. A wall hanging hole is provided on a back plate of the display device. The wall hanging hole is engaged with the outer wall hanging component to enable the display device hanged to the outer wall hanging component. When the display device is hanged, a thickness of the back plate should be above 0.8 mm to avoid a deformation of the back plate, which results in a large weight of the back plate and increases an overall weight of the display device.

According to the display device assembly 100 having the mirror surface according to the embodiments of the present disclosure, a portion of the outer wall hanging component 3 passes through the avoiding hole 121 and is engaged detachably with the inner wall hanging component 2, so that a stress point between the display device 1 and the outer wall hanging component 3 is transferred from the back plate 12 to the inner wall hanging component 2, a strength requirement of the back plate 12 is reduced, and then the thickness of the back plate 12 may be reduced to reduce the overall weight of the display device 1, which is convenient for installation and disassembly, and beneficial to improving user experience.

For example, in some examples, the display device 1 may be a smart magic mirror. By embedding a display screen, a sensor and an operating system in a mirror in the related art, a mirror display function and a human-mirror interaction function are added into the mirror. A user may wake up a magic mirror system and control a smart home device through touch, human body sensing or voice recognition.

The smart magic mirror may have the following five modules which are a life service module, a smart control module, a health service module, a beauty service module and a news and entertainment module. The life service module displays life information such as weather, time, calendar and schedule in real-time. The smart control module performs a linkage control of bath, lighting, a curtain, an air conditioner, a refrigerator, an air purifier. The health service module collects data such as weight, blood pressure, blood sugar and provides a personalized health service. The beauty service module provides a virtual makeup, a beauty tutorial, and is connected to a skin beauty device to provide a skin health service. The news and entertainment module provides rich multimedia resources such as news feed, a hot drama, a live broadcast, a radio, a music, etc.

In addition, the smart magic mirror may also be used as a virtual makeup mirror. After scanning a body of a fitting person, a 1:1 mirror image of the fitting person is mapped on the mirror surface, and then digital imaging is used to match different colors and styles of clothes to achieve a virtual fitting effect, the fitting person only needs to rotate in front of a camera to see the fitting effect at different angles.

In some embodiments of the present disclosure, referring to FIG. 3, a thickness of the back plate 12 ranges from 0.2 mm to 0.6 mm. In other words, the thickness of the back plate 12 may be any value from 0.2 mm to 0.6 mm. For example, the thickness of the back plate 12 may be 0.2 mm, 0.3 mm, 0.4 mm, 0.5 mm or 0.6 mm, etc.

Therefore, under a circumstance that a simulation of the back plate 12 reaches a wall hanging strength, the thickness of the back plate 12 may be reduced to reduce the weight of the back plate 12, the overall weight of the display device 1 is reduced, which is convenient for the user to finish the installation and disassembly of the display device 1, and is beneficial to improving user experience.

Figure 6:
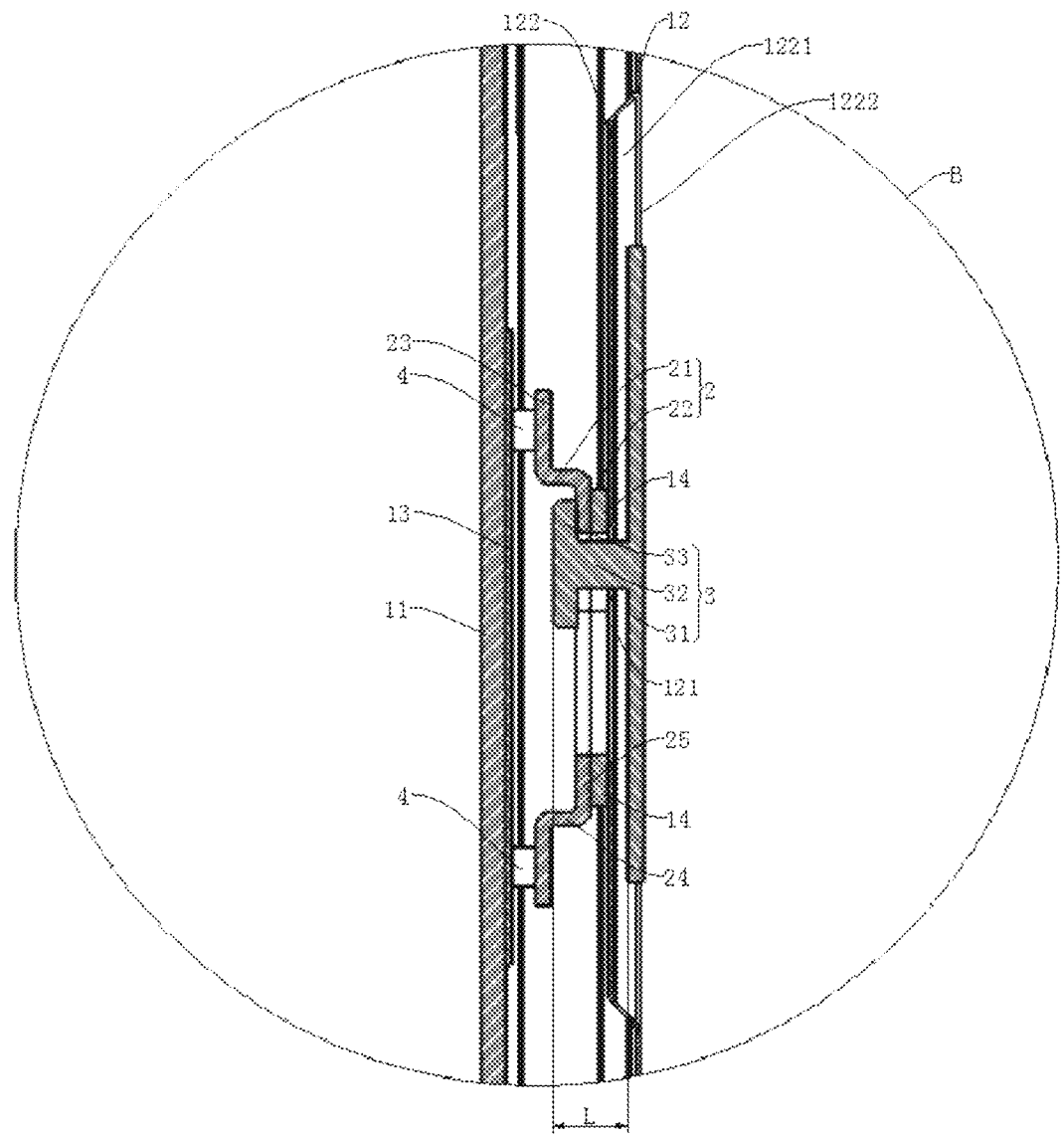
FIG. 6 is an enlarged view of B in FIG. 5.

In some embodiments of the present disclosure, referring to FIG. 2 and FIG. 6, the inner wall hanging component 2 is connected to the mirror component 11, and a surface of the mirror component 11 facing the inner wall hanging component 2 is provided with a fixing plate 13. The inner wall hanging component 2 and the fixing plate 13 are connected by using a fastener 4 (such as a screw). Thereby, it is convenient to connect the inner wall hanging component 2 to the mirror component 11, and it is beneficial to improving a reliability of the connection between the inner wall hanging component 2 and the mirror component 11, and improving a carrying capacity of the inner wall hanging component 2.

Further, as shown in FIG. 2, the fixing plate 13 is adhesively connected to the mirror component 11. It should be appreciated that, the mirror component 11 is made of glass, and the fixing plate 13 is adhesively connected to the mirror component 11, such that a damage to the mirror component 11 may be avoided when the fixing plate 13 and the mirror component 11 are connected by using a screw, and it is convenient to connect the fixing plate 13 to the mirror component 11, which is conducive to improving a production efficiency.

In some examples, as shown in FIG. 2, the fixing plate 13 is adhesively connected to the mirror component 11, and the inner wall hanging component 2 is only connected to the fixing plate 13 through a plurality of fasteners 4 and is not connected to the back plate 12, therefore, the strength requirement of the back plate 12 is further reduced, and it is beneficial to further realizing a weight reduction design of the back plate 12.

In some embodiments of the present disclosure, referring to FIG. 2, the inner wall hanging component 2 includes a first segment 21 and a second segment 22 located in a first direction of the avoiding hole 121. One end of the first segment 21 is connected to the mirror component 11, and the other end of the first segment 21 extends along a direction close to the back plate 12. One end of the second segment 22 is connected to the other end of the first segment 21 and the other end of the second segment 22 extends along a second direction. The first direction is a direction parallel to a direction from the avoiding hole 121 to the first segment 21 when the inner wall hanging component 2 and the outer wall hanging component 3 are engaged, the second direction is a direction opposite to the first direction.

Referring to FIG. 2, the outer wall hanging component 3 includes a body plate 31, a first connection segment 32 and a second connection segment 33. The body plate 31 is located on a side of the back plate 12 away from the mirror component 11. One end of the first connection segment 32 is connected to a side surface of the body plate 31 facing the back plate 12, and the other end of the first connection segment 32 extends along a direction close to the mirror component 11 and passes through the avoiding hole 121. One end of the second connection segment 33 is arrange on a portion of the first connection segment 32 between the mirror component 11 and the back plate 12, and the other end of the second connection segment 33 extends along the first direction.

The other end of the second connection segment 33 abuts a surface of the first segment 21 facing the second direction; and/or a surface of the second segment 22 facing the second direction abuts the portion of the first connection segment 32 between the mirror component 11 and the back plate 12.

It should be appreciated that, the outer wall hanging component 3 may be mounted to the wall 200 through the fastener 4 at first, and then the display device 1 is hanged to the outer wall hanging component 3 (referring to FIG. 4). When the display device 1 is hanged to the outer wall hanging component 3, it may be that the other end of the second connecting segment 33 abuts the surface of the first segment 21 facing the second direction, or it may be that the surface of the second segment 22 facing the second direction abuts the portion of the first connection segment 32 between the mirror component 11 and the back plate 12. Or it may also be that the other end of the second connection segment 33 abuts the surface of the first segment 21 facing the second direction, and the surface of the second segment 22 facing the second direction abuts the portion of the first connection segment 32 between the mirror component 11 and the back plate 12. As a result, a position limitation of the display device 1 in the first direction and the second direction (in an up-down direction as shown in FIG. 1) may be realized, and a structure is simple, which is beneficial to reducing a production cost of the display device assembly 100 and facilitates the user to hang the display device 1 to the external wall hanging component 3.

In the description of the present disclosure, it should be appreciated that, a direction or position relationship indicated by a term such as "center", "longitudinal", "lateral", "length", "width", "thickness", "up", "down", "front", "rear", "left", "right", "vertical", "horizontal", "top", "bottom", "inner", "outer", "axial", "radial" or "peripheral" is based on a direction or position relationship shown in the drawings, and only for the convenience of describing the present disclosure and simplifying the description, rather than indicating or implying that the device or element referred to must have a specific direction, be manufactured and operate at the specific direction, and therefore cannot be construed as a limitation to the present disclosure.

Further, referring to FIG. 2, the second segment 22 abuts between the second connection segment 33 and the back plate 12. Therefore, the outer wall hanging component 3 and the inner wall hanging component 2 may be engaged more tightly, and the position limitation of the display device 1 in the up-down direction and a thickness direction of the second segment 22 (a front-rear direction as shown in FIG. 1) may be realized, which is beneficial to improving the reliability of the wall hanging and reducing hidden safety dangers.

Specifically, as shown in FIG. 2, the inner wall hanging component 2 includes an annular connection plate 23, a cylindrical connection cylinder 24 and an annular flange plate 25. The connection plate 23 is connected to the mirror component 11. One axial end (a front end shown in FIG. 1) of the connection cylinder 24 is connected to an inner peripheral wall of the connection plate 23, and the other axial end (a rear end shown in FIG. 1) of the connection cylinder 24 extends along a direction close to the back plate 12. The connection cylinder 24 surrounds the avoiding hole 121, and a portion of the connection cylinder 24 located in the first direction of the avoiding hole 121 defines the first segment 21. An outer peripheral wall of the flange plate 25 is connected to an inner peripheral wall of the other axial end (the rear end shown in FIG. 1) of the connection cylinder 24, the flange plate 25 surrounds the avoiding hole 121, and a portion of the flange plate 25 located in the first direction of the avoiding hole 121 defines the second segment 22. Optionally, the inner wall hanging component 2 is an integrally formed piece.

Thus, it is beneficial to improving a structural strength of the first segment 21 and the second segment 22, and thereby enhancing the reliability of the connection between the outer wall hanging component 3 and the inner wall hanging component 2.

In some examples, as shown in FIG. 2, the outer wall hanging component 3 includes a wall hanging screw, the wall hanging screw includes a screw head and a stud, an axial end of the stud is welded to the body plate 31, the other axial end of the stud is connected to the screw head, the stud defines the first connection segment 32, and a portion of the screw head in the first direction of the avoiding hole 121 defines the second connection segment 33.

Further, a waterproof component 14 is provided between the flange plate 25 and the back plate 12, and the waterproof component 14 is of an annular shape and surrounds the avoiding hole 121. Thus, it is beneficial to preventing water vapor outside from entering the display device 1 through a gap between the flange plate 25 and the back plate 12, so that the display device assembly 100 is suitable for installation in a humid environment such as a bathroom, a kitchen, etc., and a scope of the applicable installation environment of the display device assembly 100 is extended. For example, the waterproof component 14 may be made of a flexible material such as silicone, rubber, sponge, etc.

Figure 5:
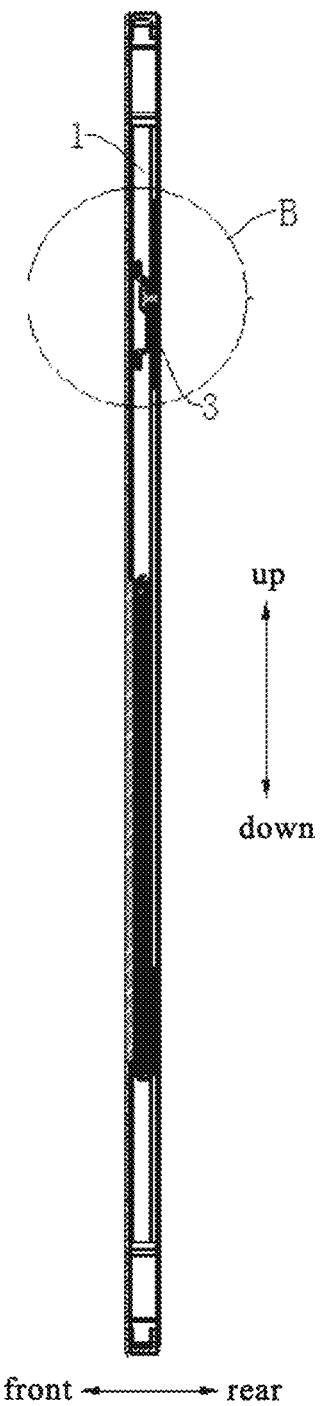
FIG. 5 is a schematic structural view of a display device assembly having a mirror surface according to another embodiments of the present disclosure.

In some embodiments of the present disclosure, referring to FIG. 5 and FIG. 6, a length of the first connection segment 32 ranges from 4 mm to 8 mm. It should be appreciated that, when the outer wall hanging component 3 includes the wall hanging screw, the length of the first connecting segment 32 is a length of the wall hanging screw. For example, the length of the first connection segment 32 is L, and L may be a value such as 4 mm, 5 mm, 6 mm, 7 mm or 8 mm, etc.

It is found through practical study that, in the related art, in order to reliably install the display device on the outer wall hanging component, when the display device is hanged to the outer wall hanging component, a unilateral gap is limited to 0.5 mm according to the thickness of the back plate, that is, a gap between the back plate and the outer wall hanging component should be smaller than or equal to 0.5 mm, so the length of the entire wall hanging screw is about 3 mm. Since the length of the wall hanging screw is relatively small, it is not easy for the user to finish the wall hanging when installing the display device.

According to the display device assembly 100 having the mirror surface according to the embodiments of the present disclosure, the outer wall hanging component 3 extends into the display device 1 to be engaged with the inner wall hanging component 2. On the basis of ensuring that the display device 1 is reliably installed on the outer wall hanging component 3, by enabling the length of the first connection segment 32 to range from 4 mm to 8 mm, the length of the first connection segment 32 is extended, thereby facilitating the user to hang the display device 1 to the outer wall hanging component 3.

In some optional embodiments of the present disclosure, referring to FIG. 3, the avoiding hole 121 includes a mounting hole 1211 and a positioning hole 1212, the mounting hole 1211 is located in the second direction of the positioning hole 1212, the positioning hole 1212 communicates with the mounting hole 1211, and a cross-sectional area of the positioning hole 1212 is smaller than that of the mounting hole 1211, a portion of the first connection segment 32 located in the avoiding hole 121 abuts the inner wall hanging component in the positioning hole 1212.

It should be appreciated that, when hanging the display device 1 to the outer wall hanging component 3, a portion of the first connection segment 32 and the second connection segment 33 may be extended into the display device 1 from the mounting hole 1211, and then the display device 1 may be moved along the second direction (downward shown in FIG. 1) until the outer wall hanging component 3 and the inner wall hanging component 2 are engaged (referring to FIG. 2). At the same time, the portion of the first connecting segment 32 located in the avoiding hole 121 abuts the inner wall hanging component in the positioning hole 1212, which may further improve the reliability of the connection between the display device 1 and the outer wall hanging component 3.

In some embodiments of the present disclosure, referring to FIG. 5 and FIG. 6, a portion of the back plate 12 is recessed toward the mirror component 11 to form a recessed portion 122 (For example, as shown in FIG. 5, a portion of the back plate 12 is recessed forward to form the recessed portion 122), and the avoiding hole 121 is provided on the recessed portion 122 (referring to FIG. 7), the recessed portion 122 defines an accommodation space 1221 for accommodating the outer wall hanging component 3. For example, as shown in FIG. 7, there are two avoiding holes 121 which are spaced apart in a left-right direction.

It should be noted that, in the related art, when the display device is hanged on the wall, there is at least the body plate of the outer wall hanging component between the display device and the wall in the front-rear direction, which may not enable the display device to be attached completely to a wall surface, may cause a gap between the display device and the wall to be too large, and may affect the reliability and aesthetics of the installation of the display device on the wall.

According to the display device assembly 100 having the mirror surface according to the embodiments of the present disclosure, by accommodating the outer wall hanging component 3 in the accommodation space 1221 of the recessed portion 122, the gap between the display device 1 and the wall may be reduced, which may enable the display device to be attached completely to the wall surface, and improve the reliability and aesthetics of the installation of the display device 1 on the wall 200.

Figure 7:
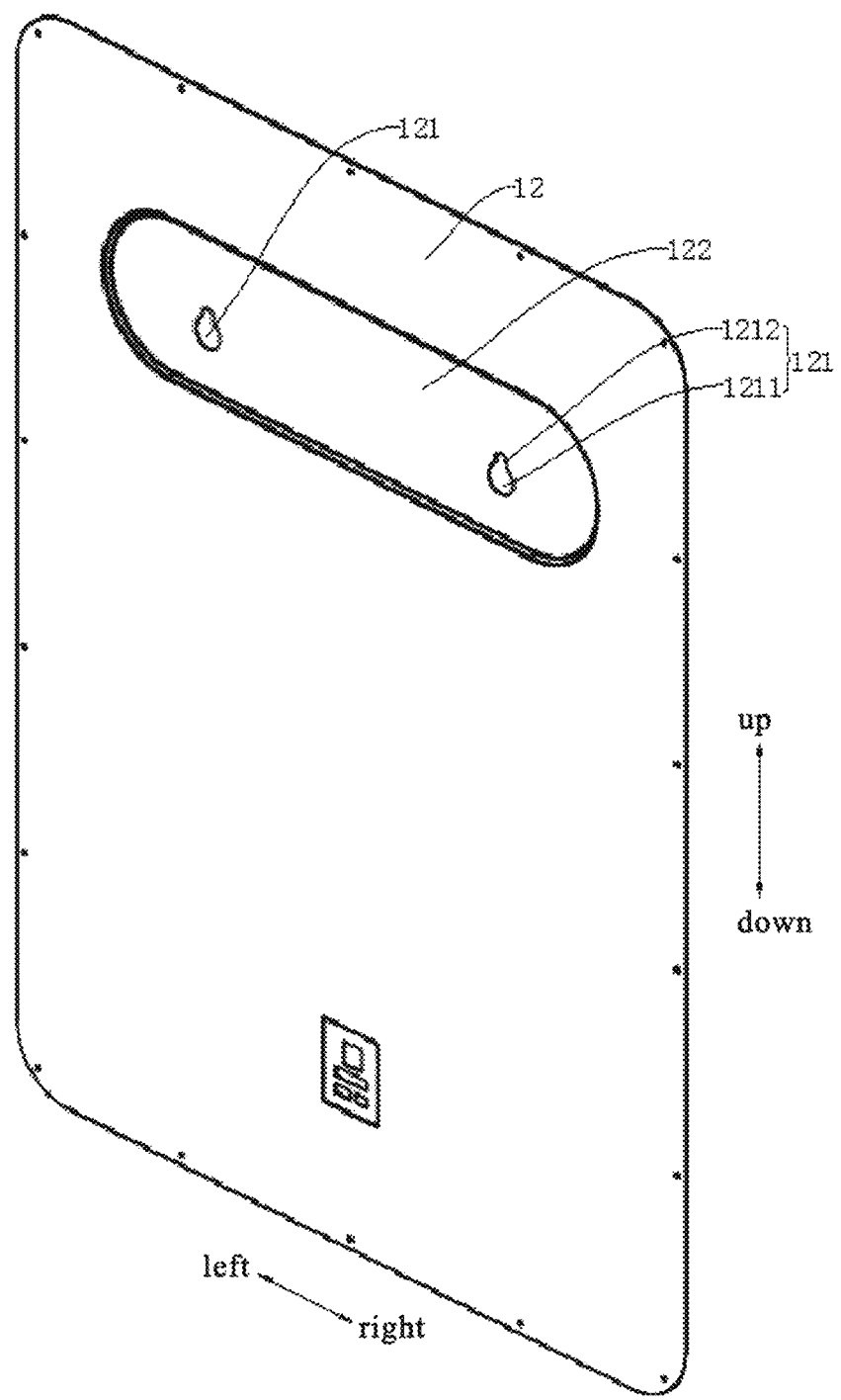
FIG. 7 is a schematic structural view of a back plate according to other embodiments of the present disclosure.
Figure 8:
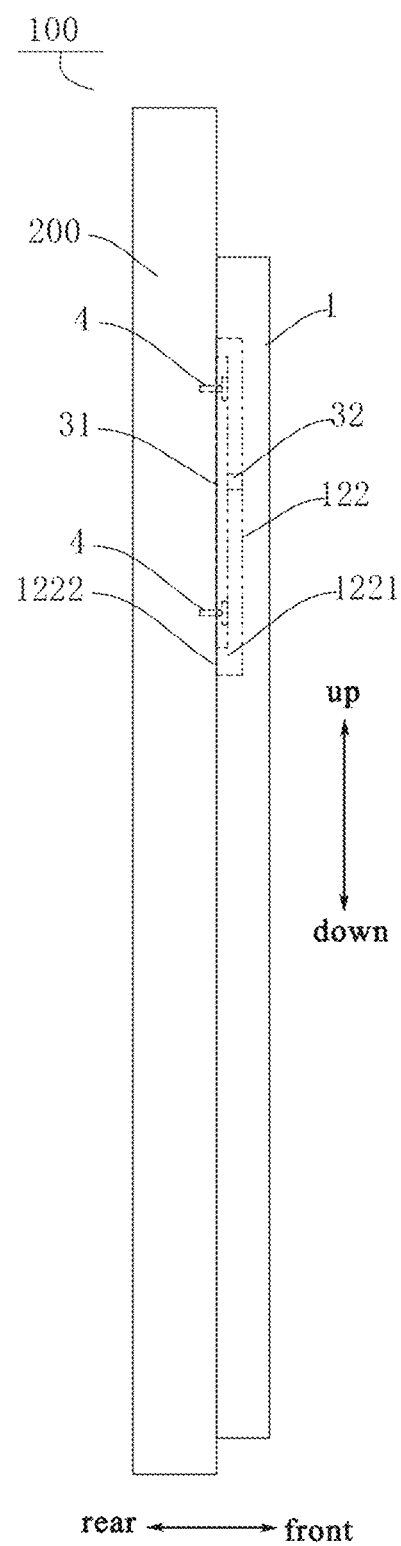
FIG. 8 is a schematic view of a display device assembly having a mirror surface mounted to a wall according to other embodiments of the present disclosure.

Further, referring to FIG. 7 and FIG. 8, a side surface of the outer wall hanging component 3 away from the mirror component 11 is flush with an end surface of an open end 1222 of the recessed portion 122. For example, as shown in FIG. 8, a rear surface of the body plate 31 of the outer wall hanging component 3 is flush with the end surface of the open end 1222 of the recessed portion 122. Thus, the display device 1 may be completely attached to the wall surface, which is beneficial to improving the reliability of the installation of the display device assembly 100 on the wall, reducing a space occupation of the display device assembly 100 and further improving the reliability and aesthetics of the installation of the display device 1 on the wall 200.

Figure 9:
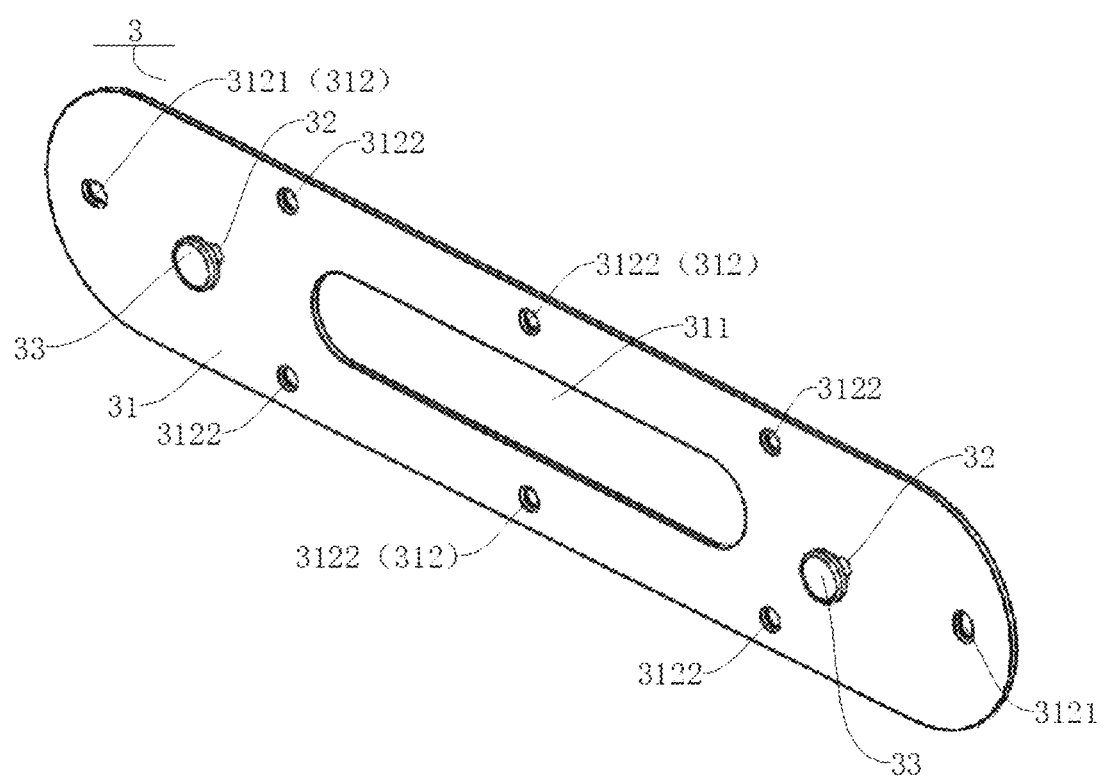
FIG. 9 is a schematic structural view of an external wall hanging component according to some embodiments of the present disclosure.

In some embodiments of the present disclosure, referring to FIG. 9, the outer wall hanging component 3 is provided with a weight reduction hole 311 and a plurality of fixing holes 312, the weight reduction hole 311 is located in the middle of the outer wall hanging component 3 and penetrates the outer wall hanging component 3 in a thickness direction of the outer wall hanging component 3, and the plurality of fixing holes 312 are spaced apart in a peripheral direction of the weight reduction hole 311. Thus, it is convenient for the fasteners 4 to pass through the fixing holes 312 to mount the outer wall hanging component 3 on the wall 200, and a level measuring instrument may be snapped into the weight reduction hole 311 to measure an installation level of the outer wall hanging component 3 during the installation.

For example, in some examples, as shown in FIG. 9, the weight reduction hole 311 may be of a shape composed of two long U-shapes, and the plurality of fixing holes 312 include two main fixing holes 3121 and a plurality of auxiliary fixing holes 3122, and the two main fixing holes 3121 are respectively located on left and right sides of the weight reduction hole 311 (that is, are respectively located at the bottoms of the two long U-shapes). Two fasteners 4 are inserted into the two main fixing holes 3121 in a one-to-one correspondence to install the outer wall hanging component 3 on the wall 200. In addition, the fasteners 4 may be provided in the auxiliary fixing holes 3122 according to practical requirements to improve the reliability of the connection between the outer wall hanging component 3 and the wall 200.

Other configurations and operations of the display device assembly 100 having the mirror surface according to the embodiments of the present disclosure are known to those of ordinary skill in the art, and will not be described in detail herein.

In the description of the present specification, a description of a reference term such as "one embodiment", "some embodiments", "a schematic embodiment", "an example", "a specific example", or "some examples" means to incorporate specific features, structures, materials, or characteristics described in the embodiment or example to at least one embodiment or example of the present disclosure. In the specification, a schematic expression of the term does not necessarily refer to a same embodiment or example. Moreover, the specific features, structures, materials or characteristics described may be combined in any suitable manner into any one or more embodiments or examples.

Although the embodiments of the present disclosure have been shown and described, those of ordinary skill in the art may understand that various changes, modifications, replacements and variations may be made to the embodiments without departing from the principle and purpose of the present disclosure. The protection scope of the present disclosure is defined by the claims and equivalents thereof.

What is claimed is:

1. A display device assembly having a mirror surface, comprising: a display device having the mirror surface, wherein the display device comprises a mirror component and a back plate spaced apart from each other, and the back plate is provided with an avoiding hole; an inner wall hanging component, wherein the inner wall hanging component is located between the mirror component and the back plate and is connected to at least one of the mirror component and the back plate; and an outer wall hanging component, wherein the outer wall hanging component is located on a side of the back plate away from the mirror component, and a portion of the outer wall hanging component passes through the avoiding hole and is engaged detachably with the inner wall hanging component, wherein the inner wall hanging component is connected to the mirror component, a surface of the mirror component facing the inner wall hanging component is provided with a fixing plate, and the inner wall hanging component and the fixing plate are connected by using a fastener, and wherein the inner wall hanging component is not connected to the back plate.

2. The display device assembly having the mirror surface according to claim 1, wherein a thickness of the back plate ranges from 0.2 mm to 0.6 mm.

3. The display device assembly having the mirror surface according to claim 1, wherein the fixing plate is adhesively connected to the mirror component.

4. The display device assembly having the mirror surface according to claim 1, wherein the inner wall hanging component comprises: a first segment and a second segment located in a first direction of the avoiding hole, wherein one end of the first segment is connected to the mirror component, the other end of the first segment extends along a direction which is close to the back plate, one end of the second segment is connected to the other end of the first segment and the other end of the second segment extends along a second direction; the first direction is parallel to a direction from the avoiding hole to the first segment when the inner wall hanging component and the outer wall hanging component are engaged, the second direction is opposite to the first direction;

the outer wall hanging component comprises a body plate, a first connection segment and a second connection segment, wherein the body plate is located on a side of the back plate away from the mirror component, and one end of the first connection segment is connected to a side surface of the body plate facing the back plate, the other end of the first connection segment extends along a direction close to the mirror component and passes through the avoiding hole, one end of the second connection segment is provided on a portion of the first connection segment between the mirror component and the back plate, and the other end of the second connection segment extends along the first direction; and the other end of the second connection segment abuts a surface of the first segment facing the second direction; and/or a surface of the second segment facing the second direction abuts the portion of the first connection segment between the mirror component and the back plate.

5. The display device assembly having the mirror surface according to claim 4, wherein the second segment abuts between the second connection segment and the back plate.

6. The display device assembly having the mirror surface according to claim 4, wherein the inner wall hanging component comprises:

an annular connection plate, wherein the connection plate is connected to the mirror component;

a cylindrical connection cylinder, wherein one axial end of the connection cylinder is connected to an inner peripheral wall of the connection plate, the other axial end of the connection cylinder extends along a direction which is close to the back plate, and the connection cylinder surrounds the avoiding hole, a portion of the connection cylinder located in the first direction of the avoiding hole defines the first segment; and an annular flange plate, wherein an outer peripheral wall of the flange plate is connected to an inner peripheral wall of the other axial end of the connection cylinder, the flange plate surrounds the avoiding hole, and a portion of the flange plate located in the first direction of the avoiding hole defines the second segment.

7. The display device assembly having the mirror surface according to claim 6, wherein a waterproof component is provided between the flange plate and the back plate, and the waterproof component is of an annular shape and surrounds the avoiding hole.

8. The display device assembly having the mirror surface according to claim 7, wherein the waterproof component is made of silicone, rubber or sponge.

9. The display device assembly having the mirror surface according to claim 4, wherein the outer wall hanging component comprises a wall hanging screw, the wall hanging screw comprises a screw head and a stud, an axial end of the stud is welded to the body plate, the other axial end of the stud is connected to the screw head, the stud defines the first connection segment, and a portion of the screw head in the first direction of the avoiding hole defines the second connection segment.

10. The display device assembly having the mirror surface according to claim 4, wherein a length of the first connection segment ranges from 4 mm to 8 mm.

11. The display device assembly having the mirror surface according to claim 4, wherein the avoiding hole comprises a mounting hole and a positioning hole, the mounting hole is located in the second direction of the positioning hole, the positioning hole connecting with the mounting hole, and a cross-sectional area of the positioning hole is smaller than that of the mounting hole, a portion of the first connection segment located in the avoiding hole abuts the inner wall hanging component in the positioning hole.

12. The display device assembly having the mirror surface according to claim 1, wherein a portion of the back plate is recessed toward the mirror component to form a recessed portion, and the avoiding hole is provided on the recessed portion, the recessed portion defines an accommodation space for accommodating the outer wall hanging component.

13. The display device assembly having the mirror surface according to claim 12, wherein a side surface of the outer wall hanging component away from the mirror component is flush with an end surface of an open end of the recessed portion.

14. The display device assembly having the mirror surface according to claim 1, wherein the outer wall hanging component is provided with a weight reduction hole and a plurality of fixing holes, the weight reduction hole is located in the middle of the outer wall hanging component and penetrates the outer wall hanging component in a thickness direction of the outer wall hanging component, and the plurality of fixing holes are spaced apart in a peripheral direction of the weight reduction hole.

15. The display device assembly having the mirror surface according to claim 14, wherein the weight reduction hole is of a shape composed of two long U-shapes, and the plurality of fixing holes comprise two main fixing holes and a plurality of auxiliary fixing holes, and the two main fixing holes are respectively located at the bottoms of the two long U-shapes.

\* \* \* \* \*